(12) United States Patent
Cai et al.

(10) Patent No.: US 10,255,397 B2
(45) Date of Patent: Apr. 9, 2019

(54) METHODS OF RASTERIZING MASK LAYOUT AND METHODS OF FABRICATING PHOTOMASK USING THE SAME

(71) Applicant: SAMSUNG ELECTRONICS CO., LTD., Suwon-si, Gyeonggi-do (KR)

(72) Inventors: Sibo Cai, Hwaseong-si (KR); Moon-Gyu Jeong, Gwangmyeong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 124 days.

(21) Appl. No.: 15/418,879

(22) Filed: Jan. 30, 2017

(65) Prior Publication Data

US 2017/0277813 A1 Sep. 28, 2017

(30) Foreign Application Priority Data

Mar. 25, 2016 (KR) .......................... 10-2016-0036205

(51) Int. Cl.
*G06F 17/50* (2006.01)
*G03F 1/36* (2012.01)

(52) U.S. Cl.
CPC .............. *G06F 17/504* (2013.01); *G03F 1/36* (2013.01); *G06F 17/5072* (2013.01); *G06F 17/5081* (2013.01); *G06F 2217/12* (2013.01)

(58) Field of Classification Search
USPC ......................................................... 716/52
See application file for complete search history.

(56) References Cited

U.S. PATENT DOCUMENTS

| 6,280,887 | B1 | 8/2001 | Lu |
| 7,222,327 | B2 | 5/2007 | Tsutsui et al. |
| 7,355,681 | B2 | 4/2008 | Laidig et al. |
| 7,405,414 | B2 | 7/2008 | Sandstrom |
| 7,571,418 | B2 | 8/2009 | Krasnoperova |
| 7,653,892 | B1 * | 1/2010 | Gennari .............. G06F 17/5068 716/50 |
| 7,774,737 | B2 | 8/2010 | Gallatin et al. |

(Continued)

FOREIGN PATENT DOCUMENTS

| JP | 2008-203398 A | 9/2008 |
| KR | 10-2009-0072670 A | 7/2009 |

(Continued)

OTHER PUBLICATIONS

Yixiano Ding, et al. "An Efficient Shift Invariant Rasterization Algorithm for All-Angle Mask Patterns in ILT", DAC '15, Jun. 7-11, 2015, San Francisco, CA, USA.

*Primary Examiner* — Bryce M Aisaka
(74) *Attorney, Agent, or Firm* — Lee & Morse P.C.

(57) ABSTRACT

A method for rasterizing a mask layout includes driving an image converter to obtain a raster image of the mask layout. The raster image is obtained by providing a pattern from the mask layout on a grid, obtaining grid points surrounding an edge of the pattern, constructing a path on the pattern which extends from the edge toward adjacent edges of the pattern, and allocating a raster value to each of the grid points. The raster value corresponds to an overlap area between a pixel, having a center located on one of the grid points, and the pattern having a boundary limited by the path.

20 Claims, 13 Drawing Sheets

(56) References Cited

U.S. PATENT DOCUMENTS

| | | | |
|---|---|---|---|
| 7,800,060 | B2 | 9/2010 | Sato et al. |
| 8,127,257 | B2 | 2/2012 | Kawakami |
| 8,331,646 | B2 | 12/2012 | Agarwal et al. |
| 8,490,032 | B2 | 7/2013 | Rieger et al. |
| 8,527,916 | B1 | 9/2013 | Chiang et al. |
| 2006/0105249 | A1 | 5/2006 | Kushida et al. |
| 2009/0007053 | A1 | 1/2009 | Kim |
| 2010/0083208 | A1* | 4/2010 | Lai .................. G06F 17/5081 716/118 |

FOREIGN PATENT DOCUMENTS

| | | |
|---|---|---|
| KR | 10-2009-0077587 A | 7/2009 |
| KR | 10-2009-0106890 A | 10/2009 |
| KR | 10-2015-0024500 A | 3/2015 |

\* cited by examiner

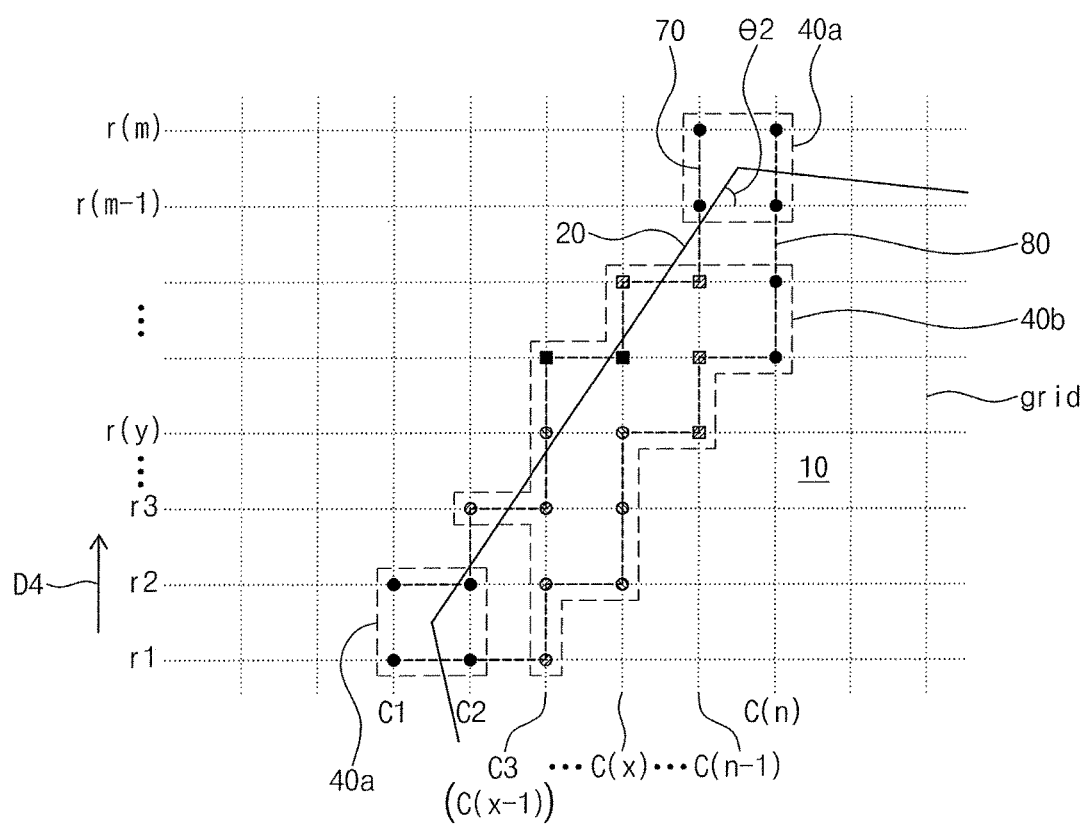

METHODS OF RASTERIZING MASK LAYOUT AND METHODS OF FABRICATING PHOTOMASK USING THE SAME

CROSS-REFERENCE TO RELATED APPLICATION

Korean Patent Application No. 10-2016-0036205, filed on Mar. 25, 2016, and entitled, "Methods of Rasterizing Mask Layout and Methods of Fabricating Photomask Using the Same," is incorporated by reference herein in its entirety.

BACKGROUND

1. Field

One or more embodiments described herein relate to a method for rasterizing a mask layout and a method for fabricating a photomask using a method for rasterizing a mask layout

2. Description of the Related Art

A photolithography process may be used to fabricate a semiconductor device. This process involves using a photomask to print an integrated circuit layout onto a wafer. One type of photomask includes a transparent region and an opaque region. The transparent region may be formed by etching a metal layer on the photomask for emitting light. The opaque region blocks light. Together, the transparent and opaque regions form mask patterns for emitting a specific pattern of light onto the wafer that corresponds to the integrated circuit layout.

As the integration of semiconductor devices increases, the distance between the mask patterns decreases and the width of the transparent region becomes narrower. This proximity may induce light interference and diffraction which distorts the layout printed on the wafer. Resolution enhancement technology (e.g., optical proximity correction) may be used in an attempt to reduce this distortion.

One type of optical proximity correction involves predicting the degree of distortion that may occur. Based on predicted results, the photomask may be changed to produce correct mask patterns, which, in turn, are used to a produce a corrected layout printed on the wafer. Optical proximity correction may be performed, for example, based on a lithography simulation that predicts a contour image to be formed on the wafer from a designed mask layout. Rasterization of the mask layout may be required to perform the lithography simulation.

SUMMARY

In accordance with one or more embodiments, a method for rasterizing a mask layout includes driving an image converter to obtain a raster image of the mask layout by: providing, on a grid, a pattern from the mask layout; obtaining grid points surrounding an edge of the pattern; constructing, on the pattern, a path extending from the edge toward adjacent edges of the pattern; and allocating a raster value to each of the grid points, the raster value corresponding to an overlap area between a pixel having a center located on one of the grid points and the pattern having a boundary limited by the path.

In accordance with one or more other embodiments, a method for fabricating a photomask includes driving an image converter to obtain a raster image of a mask layout; driving a simulation tool to produce a contour image based on the raster image; driving a corrector to correct the mask layout based on a comparison of the contour image with a target image; and forming the photomask including mask patterns corresponding to the corrected mask layout, wherein obtaining the raster image includes: providing, on a grid, a pattern acquired from the mask layout; obtaining grid points surrounding an edge of the polygonal pattern; constructing, on the pattern, a path that extends from the edge toward adjacent edges of the pattern; and allocating a raster value to each of the grid points, the raster value corresponding to an overlap area between a pixel having a center located on one of the grid points and the pattern having a boundary limited by the path.

In accordance with one or more other embodiments, a method for converting a mask layout includes providing a pattern from a mask layout on a grid, the mask layout in a vector graphics format; obtaining grid points corresponding to an edge of the pattern; constructing a path on the pattern, the path extending from the edge toward a number of adjacent edges of the pattern; and allocating raster values to the grid points, wherein the path does not extend around all of the pattern and wherein the raster value corresponds to an overlap area between a pixel and the pattern.

BRIEF DESCRIPTION OF THE DRAWINGS

Features will become apparent to those of ordinary skill in the art by describing in detail exemplary embodiments with reference to the attached drawings in which:

FIG. 16 illustrates an embodiment of an operation in the method of FIG. 5.

DETAILED DESCRIPTION

Figure 1:
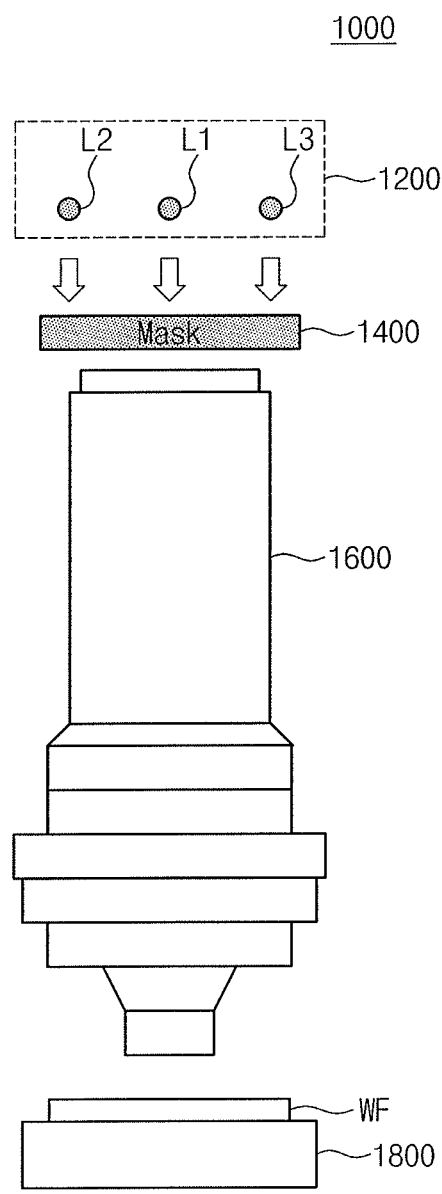
FIG. 1 illustrates an embodiment of a photolithography system.

FIG. 1 illustrates an embodiment of a photolithography system 1000 which uses a photomask manufactured according to the embodiments described herein. The photolithography system 1000 may include a light source 1200, a photomask 1400, a reduction projection apparatus 1600, and a wafer stage 1800. The photolithography system 1000 may also include other structural components, including but not limited to a sensor for detecting the surface height and gradient of a wafer WF.

The light source 1200 emits light that is irradiated to the photomask 1400. A lens may be provided, for example, between the light source 1200 and the photomask 1400 to adjust focus of the light. The light source 1200 may include an ultraviolet light source (e.g., a KrF light source having a wavelength of about 234 nm or an ArF light source having a wavelength of about 193 nm). The light source 1200 may include a single point light source L1. In another embodiment, the light source 1200 may include a plurality of point light sources, e.g., L1, L2, and L3.

The photomask 1400 may include mask patterns for printing a layout on the wafer WF. The photomask 1400 may include a transparent region and an opaque region that form the mask patterns. The transparent region may be formed, for example, by etching a metal layer on the photomask 1400. The transparent region may pass light from the light source 1200. The opaque region may block light from the light source 1200.

The reduction projection apparatus 1600 receives light that has passed through the transparent region of the photomask 1400. The reduction projection apparatus 1600 may match the mask pattern of the photomask 1400 with circuit patterns of a layout to be printed on the wafer WF. The wafer stage 1800 may support the wafer WF. For example, the reduction projection apparatus 1600 may include an aperture to increase the depth of focus of an ultraviolet light from light source 1200. The aperture may be, for example, a dipole aperture or a quadruple aperture. The reduction projection apparatus 1600 may further include, for example, a lens for adjusting the focus of light.

Light passing through the transparent region of the photomask 1400 may be irradiated on the water WF through the reduction projection apparatus 1600. The wafer WF may be printed with a layout including patterns corresponding to the mask patterns of the photomask 1400.

Figure 2:
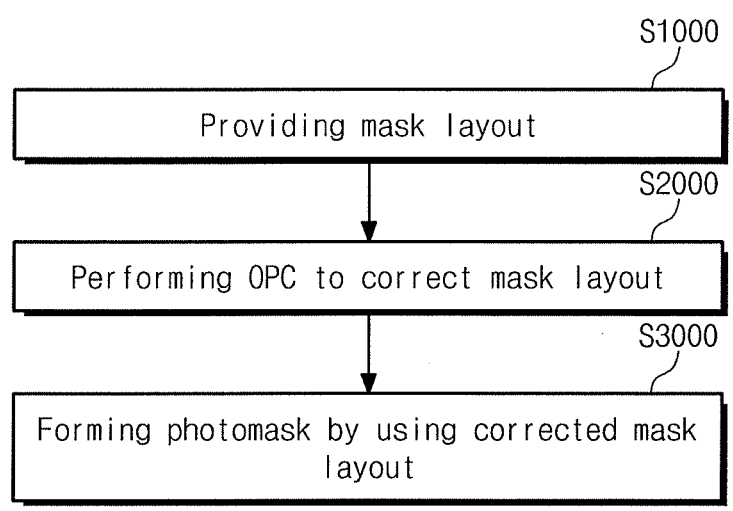
FIG. 2 illustrates an embodiment of a method for fabricating a photomask.

FIG. 2 illustrates an embodiment of a method for fabricating a photomask. The method includes providing a designed mask layout (S1000). The mask layout may include various patterns for printing an integrated circuit on a wafer. The mask layout may be represented, for example, in a vector graphics format.

An optical proximity correction (OPC) may be performed to correct the mask layout (S2000). According to some approaches, patterns of the mask layout may not be transferred onto the wafer exactly, for example, as a result of various optical effects, e.g., optical proximity effect. Optical proximity correction (OPC) may be performed on the mask layout to correct this problem. Performing optical proximity correction (OPC) may include predicting a contour image, which is to be formed on the wafer, from the mask layout and correcting the mask layout based on the predicted result.

The photomask may be formed using a mask layout corrected by the optical proximity correction (S3000). Formation of the photomask may include providing a blank mask including a metal layer and a photoresist layer formed on a quartz substrate, transferring the corrected mask layout to the photoresist layer of the blank mask, developing the photoresist layer to form photoresist patterns including patterns corresponding to the corrected mask layout, and etching the metal layer (e.g., chromium layer) of the blank mask using the photoresist patterns as an etch mask. The etch process may form the transparent region of the photomask.

Figure 3:
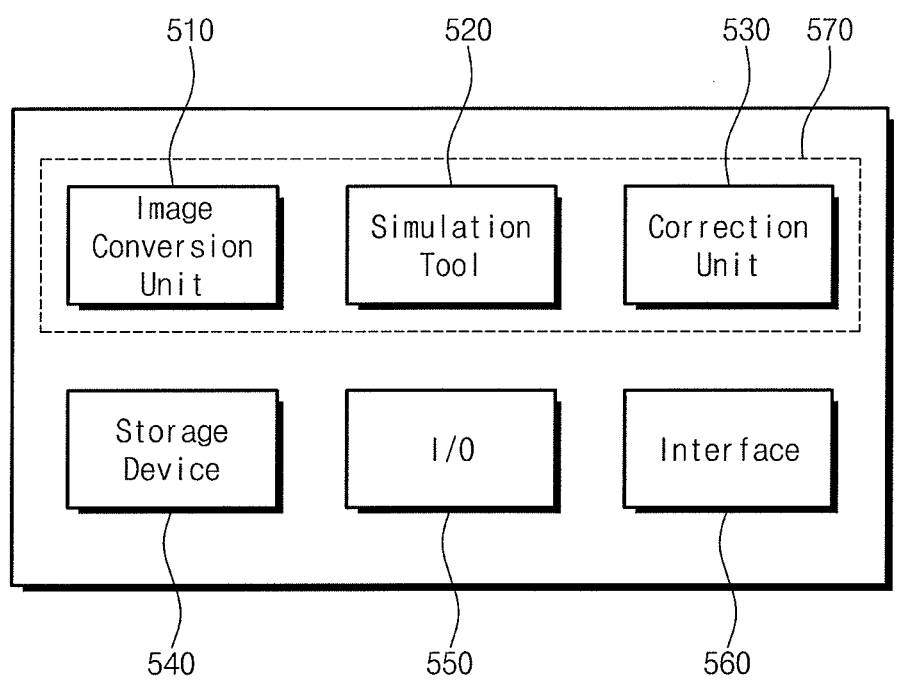
FIG. 3 illustrates an embodiment of a computer system.

FIG. 3 illustrates an embodiment of a computer system 500 for executing optical proximity correction (OPC) as indicated in operation S2000 in FIG. 2. The computer system 500 may include a controller 570 to process various data. The controller 570 may include an image conversion unit 510, a simulation tool 520, and a correction unit 530. The image conversion unit 510 converts an image of the mask layout from the vector graphics format into a raster graphics format. The simulation tool 520 produces a contour image to be formed on a wafer from the image of the mask layout, which is converted to the raster graphics format. The correction unit 530 compares a target image with the contour image produced by the simulation tool 520 and corrects the mask layout when an error between the contour and target images is beyond tolerance.

The computer system 500 may further include a storage device 540 to store various data. The storage device 540 may include, for example, a hard disk and/or a nonvolatile semiconductor memory device, e.g., a flash memory device, a phase change memory device, and/or a magnetic memory device.

The computer system 500 may further include an input/output (I/O: 550) and an interface 560. The input/output 550 may include, for example, a keyboard, a keypad, and/or a display device. Various data from external sources may be transferred to the computer system 500 through the interface 560. Various data processed by the computer system 550 may also be transferred to external destinations through the interface 560. The interface 560 may include, for example, a wired element, a wireless element, and/or a universal serial bus (USB) port. A data bus may connect the controller 570, the storage device 540, the input/output unit 550, and/or the interface 560 to each other.

Figure 4:
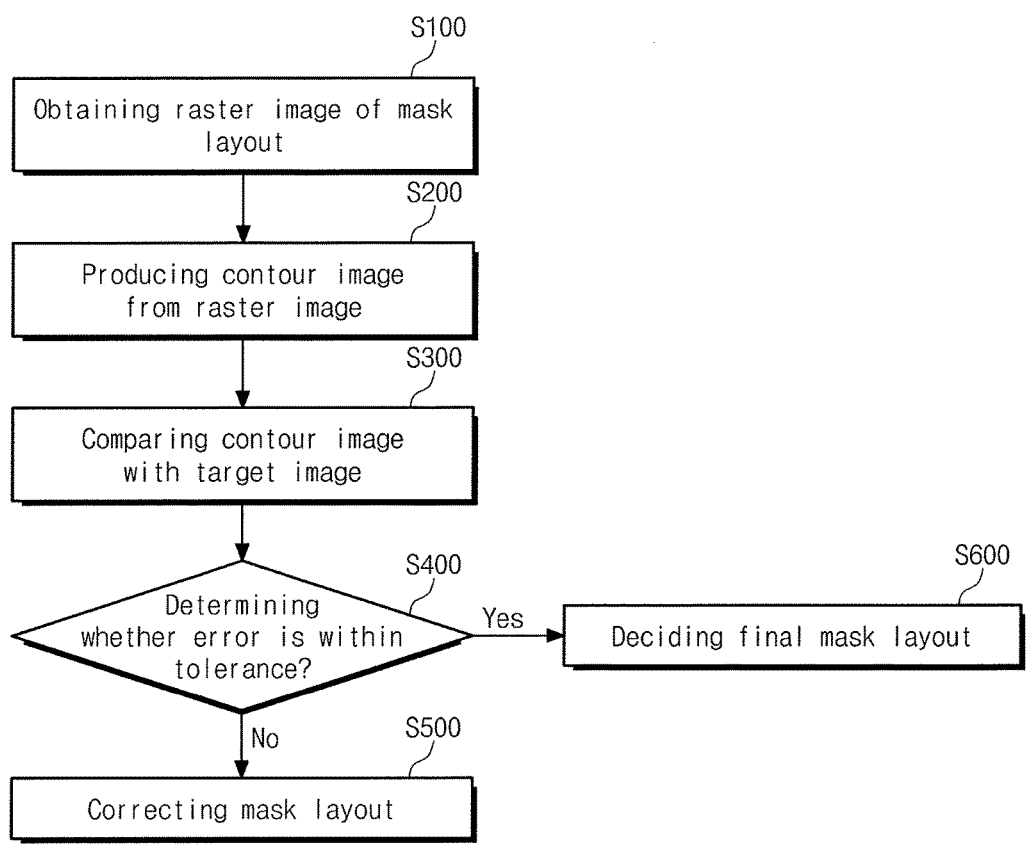
FIG. 4 illustrates an embodiment of a method for optical proximity correction.
Figure 5:
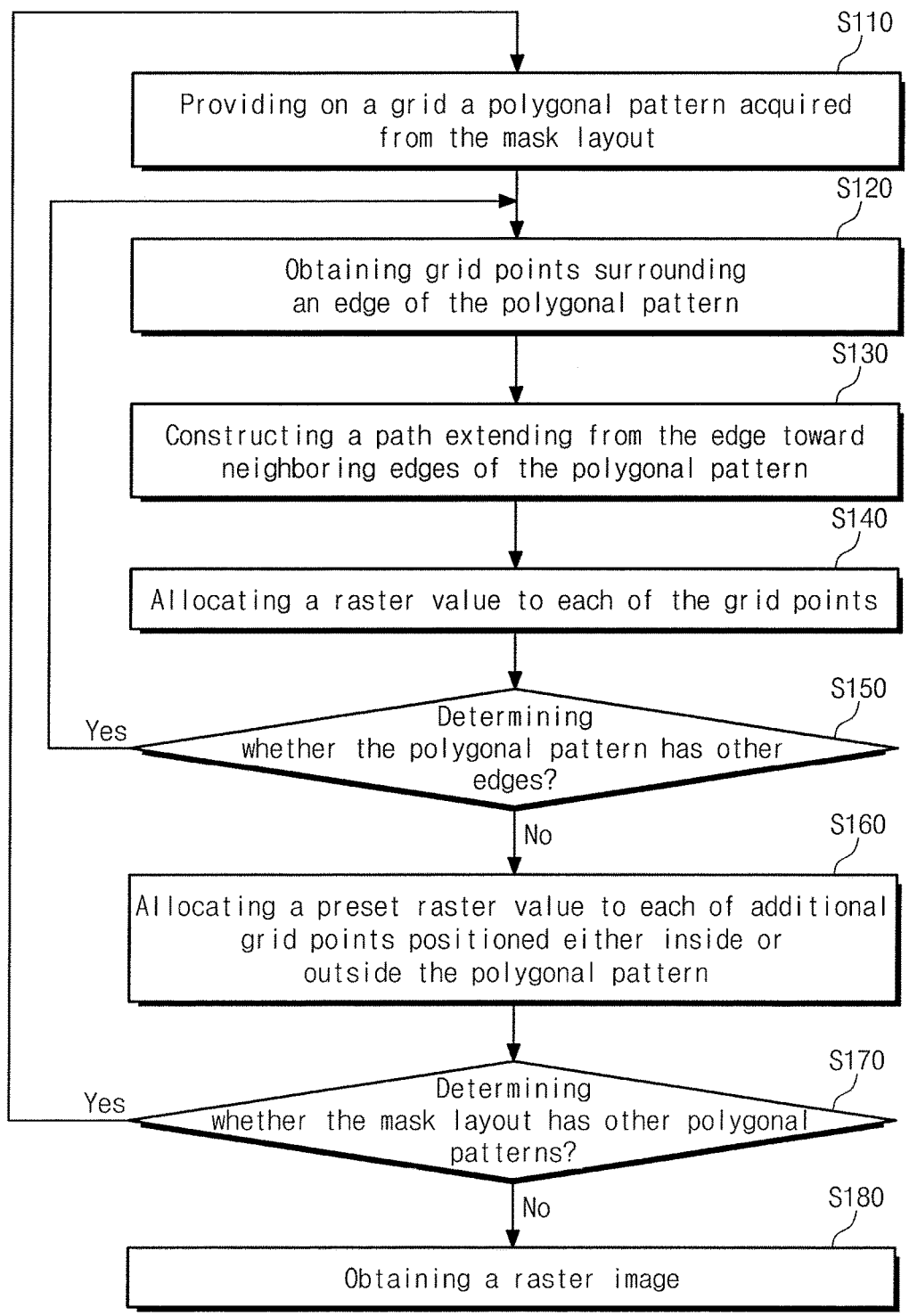
FIG. 5 illustrates an embodiment of an operation in the method of FIG. 4.
Figure 6:
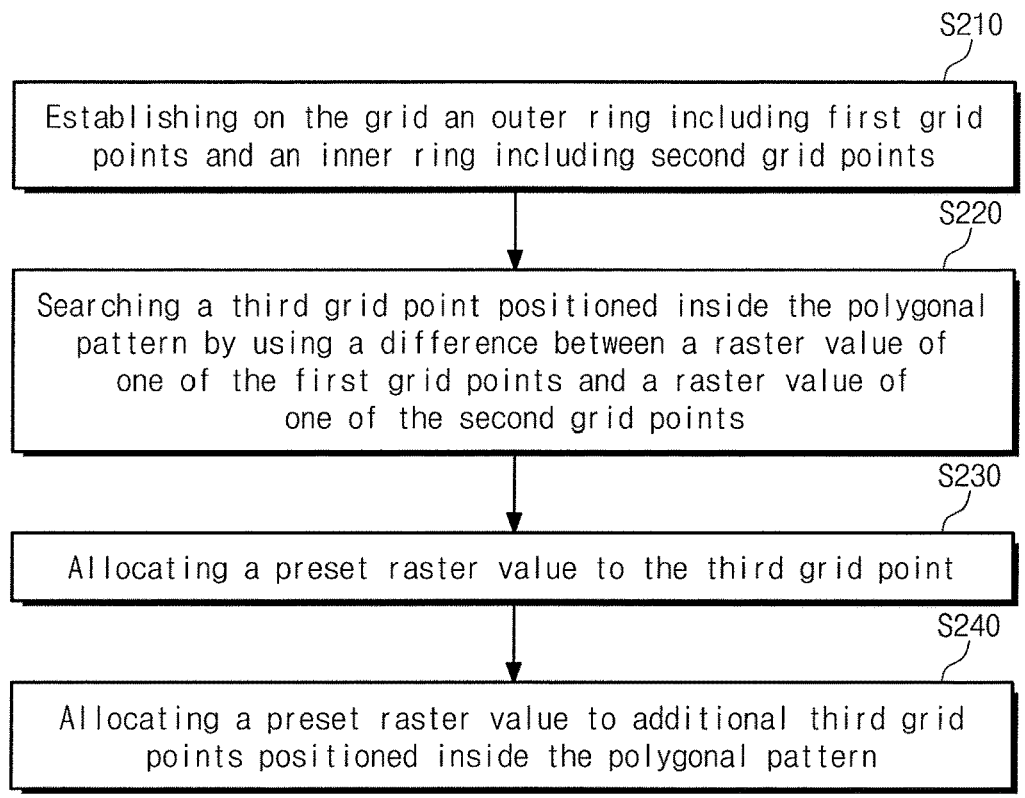
FIG. 6 illustrates an embodiment of an operation in the method of FIG. 5.
Figure 7:
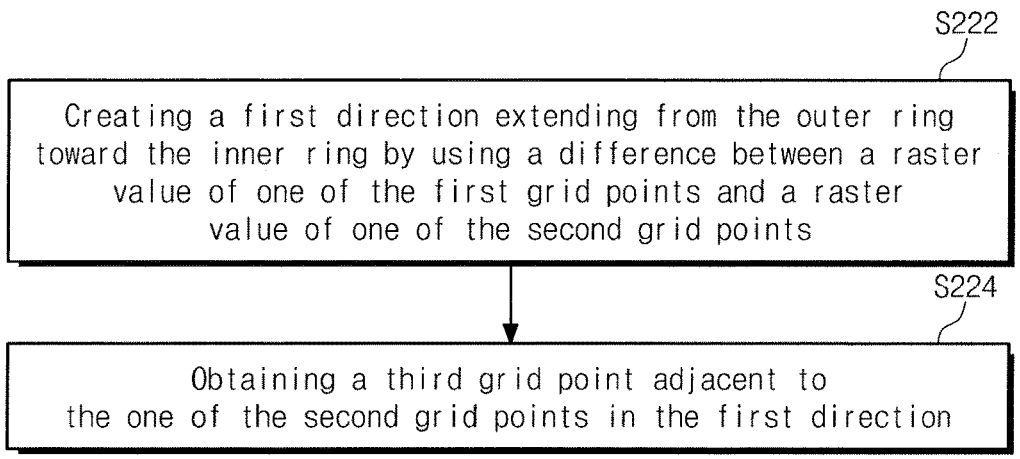
FIG. 7 illustrates an embodiment of an operation in the method of FIG. 6.
Figure 12:
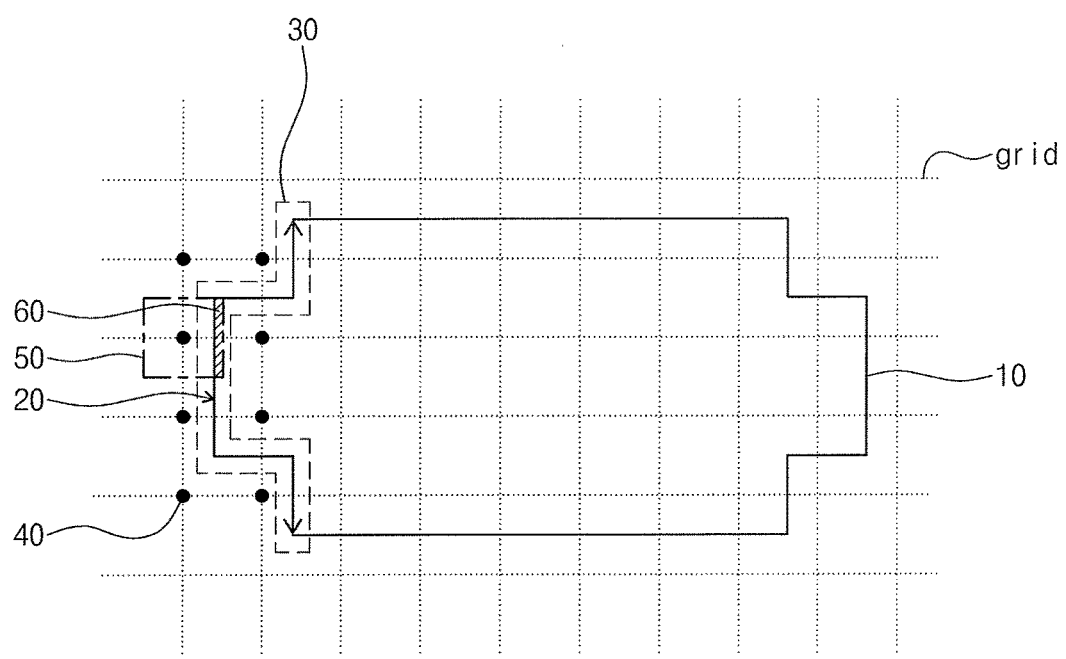
FIG. 12 illustrates an embodiment of operations in the method of FIG. 5.
Figure 13:
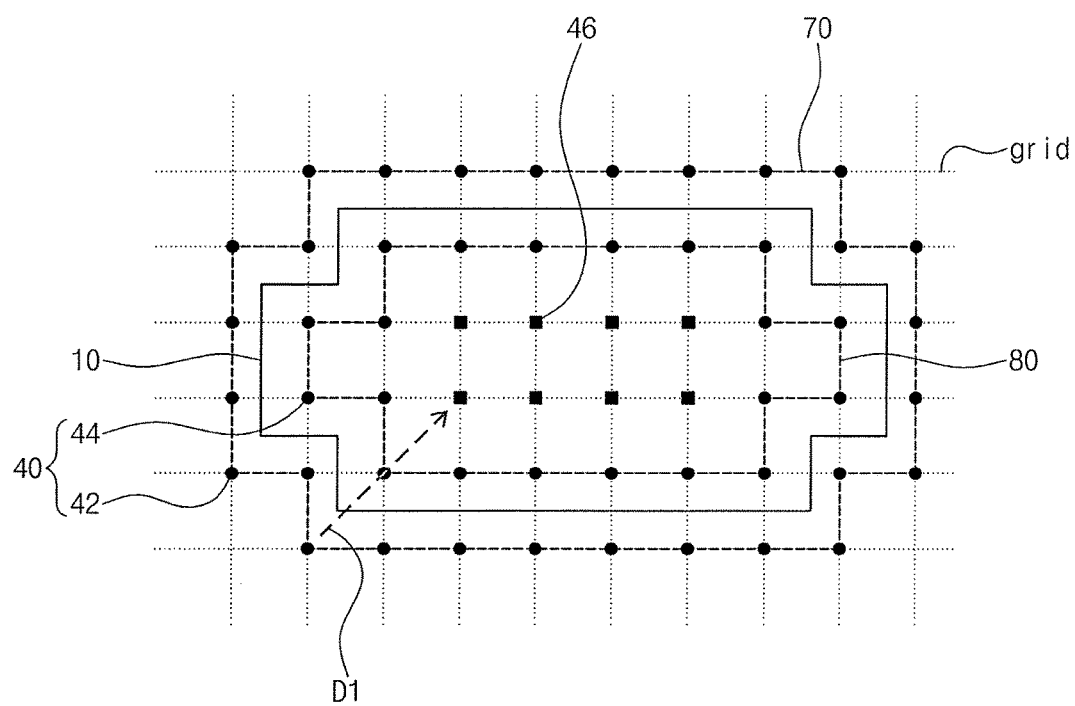
FIG. 13 illustrates an embodiment of an operation in the method of FIG. 5.

FIG. 4 illustrates an embodiment of a method for optical proximity correction (OPC) corresponding to operation S2000 in FIG. 2. FIG. 5 illustrates an embodiment of operation S100 in FIG. 4. FIG. 6 illustrates an embodiment of operation S160 in FIG. 5. FIG. 7 illustrates an embodiment of operation S220 in FIG. 6. FIG. 12 illustrates embodiments of operations S110 to S140 in FIG. 5. FIG. 13 illustrates an embodiment of operation S160 in FIG. 5.

Referring to FIG. 4, a raster image of the mask layout may be obtained (S100). The raster image may correspond, for example, to an image of the mask layout that is converted from a vector graphics format to a raster graphics format. The computer system 500 may drive the image conversion unit 510 to obtain the raster image.

Referring to FIGS. 5 and 12, in order to obtain the raster image of the mask layout, a grid may include a predetermined (e.g., polygonal) pattern 10 acquired from the mask layout (S110). The pattern 10 may have a different shape in another embodiment.

In one embodiment, the mask layout may include various predetermined (e.g., polygonal) patterns 10. These patterns 10 may be represented in the vector graphics format. In order to obtain the raster image of the mask layout, a raster image may be converted from each of images of the polygonal patterns 10 expressed in the vector graphics format. For example, first, the grid may be provided with a single polygonal pattern 10 acquired from the mask layout.

Grid points 40 surrounding an edge 20 of the polygonal pattern 10 may be obtained (S120). The grid points may correspond, for example, to cross points where rows of the grid intersect columns of the grid. As shown in the example of FIG. 12, the edge 20 of the polygonal pattern 10 may be positioned between a pair of columns (or rows) directly adjacent to each other and may extend parallel to the pair of columns (or rows). The grid points 40 surrounding the edge 20 may be positioned on the pair of columns (or rows) and arranged along the edge 20.

A path 30 may be constructed to extend from the edge 20 of the polygonal pattern 10 toward neighboring edges of the polygonal pattern 10 (S130). The path 30 may extend from opposing ends of the edge 20 toward edges adjacent to the opposing ends of the edge 20. For example, the path 30 may include the edge and other edges respectively extending from the opposing ends of the edge 20 of polygonal pattern 10.

After construction of the path 30 is performed, a rasterized value may be allocated to each of the grid points 40 (S140). A raster image of the polygonal pattern 10 may be expressed by raster data in a shape of matrix. A grid point on the grid may represent a single element in the matrix. Because grid points have corresponding raster values, the polygonal pattern 10 may be expressed as a raster image.

In some embodiments, the raster value may be an overlap area 60 between the polygonal pattern 10 and a pixel 50, with a center on one of the grid points 40. The path 30 may define a boundary of the polygonal pattern 10. Thus, the overlap area 60 between the pixel 50 and the polygonal pattern 10 may be effectively obtained at each of the grid points 40. At each of the grid points 40, the overlap area 60 between the pixel 50 and the polygonal pattern 10 may have a polygonal shape. Thus, the overlap area 60 may be obtained using a mathematical formula for calculating an area of polygon.

The pixel 50 may have a size less than limit values given by an MRC (Mask Rule Check). Mask patterns of the photomask may be formed to satisfy a predetermined rule in accordance with the resolution limit of the photolithography system 1000 discussed with reference to FIG. 1. For example, the mask patterns may have a width greater than a minimum width allowed by the photolithography system 1000 and/or may be formed spaced apart from each other by a distance greater than a minimum spaced distance allowed by the photolithography system 1000. The MRC may be performed on the mask layout so that the mask patterns satisfy the rule.

In some embodiments, the size of the pixel 50 may be less than limits determined by the MRC. The limits may include, for example, a minimum width of the polygonal patterns 10 allowed by the photolithography system 1000 and/or a minimum spaced distance between the polygonal patterns 10 allowed by the photolithography system 1000. The pixel 50 may then restrictedly overlap the path 30 constructed on the polygonal pattern 10. For example, the size of the pixel 50 may be less than the distance between the edge 20 and its opposite edge of the polygonal pattern 10, so that pixel 50 may not commonly overlap edge 20 and its opposite edge of the polygonal pattern 10.

After allocating the raster value to each of the grid points 40 surrounding the edge 20 of the polygonal pattern 10, it may be determined whether the polygonal pattern 10 has other edges (S150). When the polygonal pattern 10 has other edges, operation S120 in FIG. 5 may be returned back. For example, each of the other edges of the polygonal pattern 10 may undergo operation S120 for obtaining the grid points 40 surrounding the edge 20 of the polygonal pattern 10, operation S130 for constructing the path 30 extending from edge 20 of the polygonal pattern 10 toward neighboring edges of the polygonal pattern 10, and operation S140 for allocating the raster value to each of the grid points 40. As a result, in FIG. 13, the grid points 40 surrounding and adjoining each of the edges of the polygonal pattern 10 may be obtained. The grid points 40 may have corresponding raster values.

Referring to FIGS. 5, 6, 7, and 13, when the polygonal pattern 10 has no other edges, a preset raster value may be allocated to each of additional grid points positioned either inside or outside the polygonal pattern 10.

For example, referring to FIGS. 6 and 13, an outer ring 70 including first grid points 42 and an inner ring 80 including second grid points 44 may be established on the grid using grid points 40 respectively surrounding edges of the polygonal pattern 10 (S210). The outer ring 70 may have a structure where the first grid points 42 of grid points 40 are connected to each other by an imaginary line. The inner ring 80 may have a structure where the second grid points 44 of the grid points 40 are connected to each other by an imaginary line. The outer ring 70 may be outside the polygonal pattern 10 on the grid. The inner ring 80 may be inside the polygonal pattern 10 on the grid. The outer and inner rings 70 and 80 may have the same polygonal shape. Because each of the grid points 40 has a raster value corresponding to the overlap area 60, the raster values of the first grid points 42 may be less than those of the second grid points 44. In some embodiments, the additional grid points may be third grid points 46 positioned inside the polygonal pattern 10.

In some embodiments, the third grid point 46 inside the polygonal pattern 10 may be searched based on a difference between the raster value of one of the first grid points 42 and the raster value of one of the second grid points 44 (S220).

For example, referring to FIGS. 7 and 13, a first direction D1 may be created to extend from the outer ring 70 toward the inner ring 80 based on a difference between the raster value of one of the first grid points 42 and the raster value of one of the second grid points 44 (S222). The one of the first grid points 42 and the one of the second grid points 44 may be directly adjacent to each other on the grid. The raster values of the second grid points 44 may be greater than those of the first grid points 42. For example, the raster value of the one of the second grid points 44 may be greater than that of the one of the first grid points 42. Accordingly, the first direction D1 may be created to extend from the one of the first grid points 42 toward the one of the second grid points 44. Thereafter, the third grid point 46 adjacent to the one of the second grid points 44 in the first direction D1 may be obtained (S224).

Referring back to FIGS. 6 and 13, a preset raster value may be allocated to the obtained third grid point 46 (S230). The preset raster value may be greater than the raster values of the second grid points 44.

The preset raster value may be allocated to each of additional third grid points 46 inside the polygonal pattern 10 (S240). A flood-fill algorithm may be used to allocate the preset raster value to each of the additional third grid points 46. Thus, corresponding raster values may be given to the first and second grid points 42 and 44 respectively surrounding the edges of the polygonal pattern 10, and may also be given to the third grid points 46 inside the polygonal pattern 10. The raster values of the second grid points 44 may be greater than those of the first grid points 42. The raster values of the third grid points 46 may be greater than those of the second grid points 44. For example, each of the raster values of the third grid points 46 may be set to 1. The raster values of the first and second grid points 42 and 44 may be set to greater than 0 and less than 1. Respective initial values (e.g., 0) may be given to other grid points on the grid, except the first to third grid points 42, 44, and 46.

The polygonal pattern 10 may thus be converted to raster data in the shape of matrix, to thereby obtain a raster image of the polygonal pattern 10.

Returning to FIG. 5, a determination is made as to whether the mask layout has other polygonal patterns (S170). When the mask layout has other polygonal patterns, operation S110 in FIG. 5 may be returned back. For example, the grid may be provided with a single polygonal pattern acquired from the mask layout. Operations S120 to S160 in FIG. 5 may be performed again. When the mask layout includes a plurality of polygonal patterns, operations of S110 to S160 in FIG. 5 may be performed to obtain a raster image of each of the polygonal patterns. When the mask layout has no other polygonal patterns, a raster image of the mask layout may be obtained that includes the polygonal pattern 10 (S180).

Figure 8:
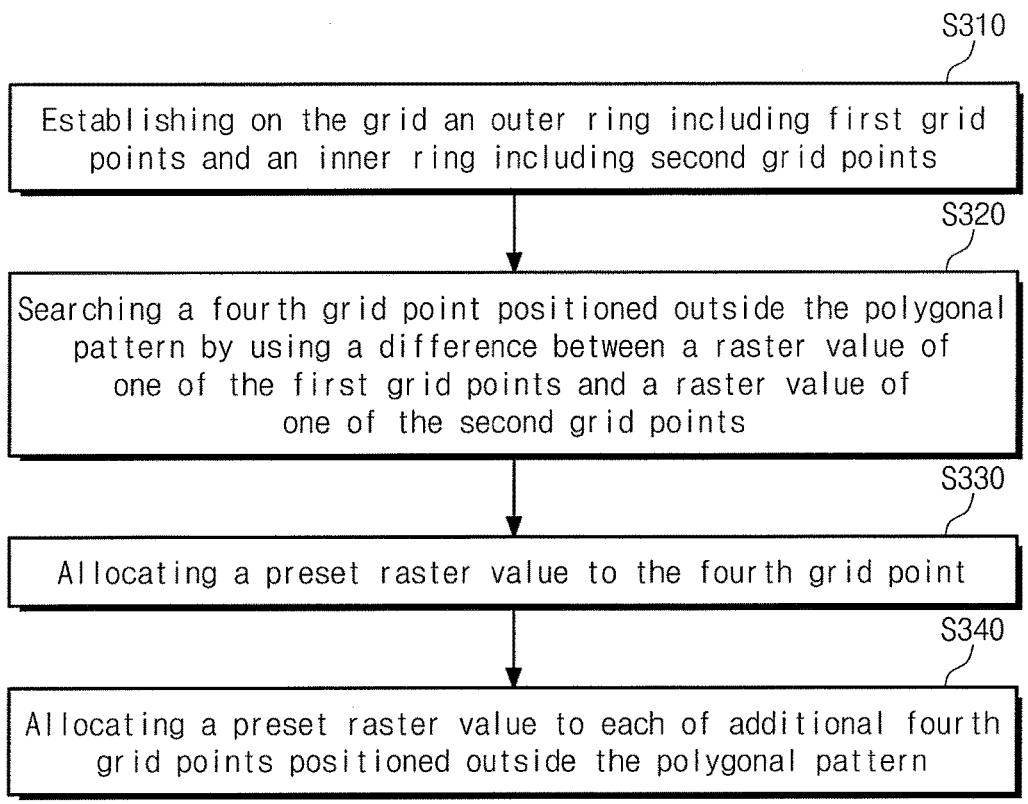
FIG. 8 illustrates an embodiment of an operation in the method of FIG. 5.
Figure 9:
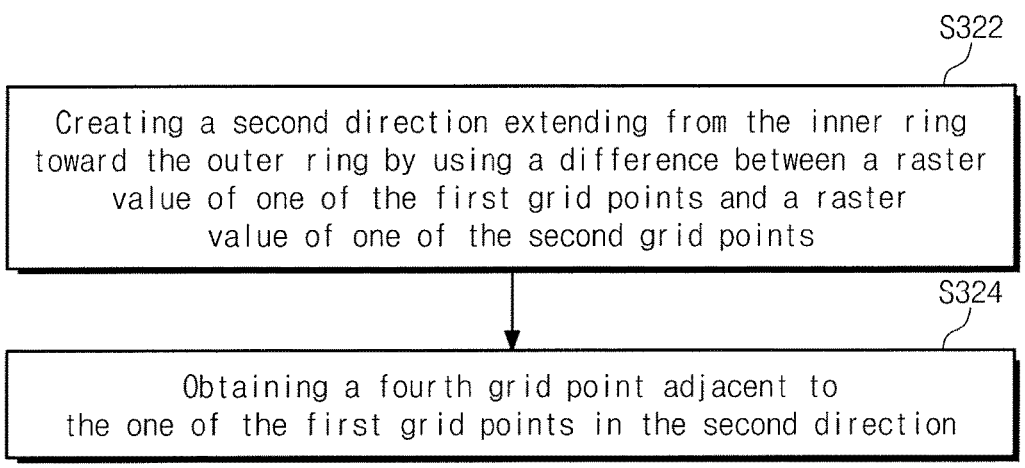
FIG. 9 illustrates an embodiment of an operation in the method of FIG. 5.
Figure 14:
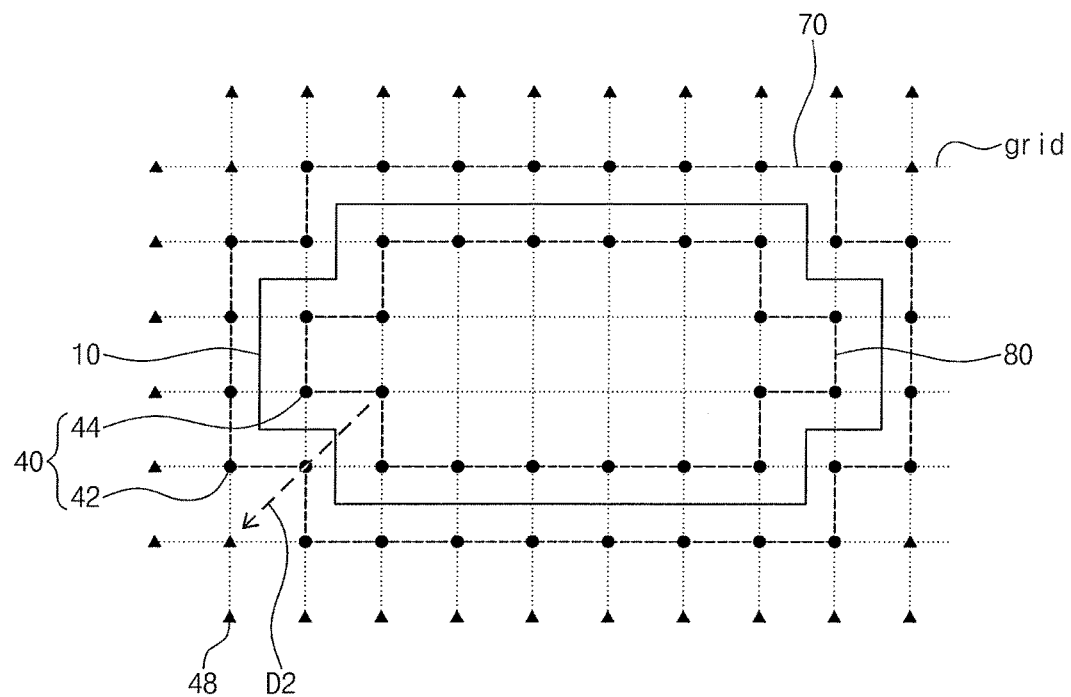
FIG. 14 illustrates an embodiment of an operation in the method of FIG. 5.

FIG. 8 illustrates an embodiment of operation S160 in FIG. 5. FIG. 9 illustrates an embodiment of operation S320 in FIG. 5. FIG. 14 illustrates an embodiment of operation S160 in FIG. 5. Referring to FIGS. 5, 8, 9 and 14, after performing operations S110 to S150 in FIG. 5 on the polygonal pattern 10 of the mask layout, a preset raster value may be allocated to each of additional grid points inside or outside the polygonal pattern 10 when the polygonal pattern 10 has no other edges.

For example, referring to FIGS. 8 and 14, an outer ring 70 including first grid points 42 and an inner ring 80 including second grid points 44 may be established on the grid using the grid points 40 respectively surrounding the edges of the polygonal pattern 10 (S310). The outer ring 70 may be established to have a structure where the first grid points 42 of the grid points 40 are connected to each other by an imaginary line. The inner ring 80 may be established to have a structure where the second grid points 44 of the grid points 40 are connected to each other by an imaginary line. The outer ring 70 may be outside the polygonal pattern 10 on the grid. The inner ring 80 may be inside the polygonal pattern 10 on the grid. The outer and inner rings 70 and 80 may have the same polygonal shape. As each of the grid points 40 has the raster value corresponding to the overlap area 60, the raster values of the first grid points 42 may be less than those of the second grid points 44. In some embodiments, the additional grid points may be fourth grid points 48 outside the polygonal pattern 10.

In some embodiments, the fourth grid point 48 outside the polygonal pattern 10 may be searched based on a difference between the raster value of one of the first grid points 42 and the raster value of one of the second grid points 44 (S320).

For example, referring to FIGS. 9 and 14, a second direction D2 may be created to extend from the inner ring 80 toward the outer ring 70 based on a difference between the raster value of one of the first grid points 42 and the raster value of one of the second grid points 44 (S322). The one of the first grid points 42 and the one of the second grid points 44 may be immediately adjacent to each other on the grid. The raster values of the first grid points 42 may be less than those of the second grid points 44. For example, the raster value of the one of the first grid points 42 may be less than that of the one of the second grid points 44. Accordingly, the second direction D2 may be created to extend from the one of the second grid points 44 toward the one of the first grid points 42. Thereafter, the fourth grid point 48 adjacent to the one of the first grid points 42 in the second direction D2 may be obtained (S324).

Referring back to FIGS. 8 and 14, a preset raster value may be allocated to the obtained fourth grid point 48 (S330). The preset raster value may be greater than the raster values of the second grid points 44.

The preset raster value may be allocated to each of additional fourth grid points 48 outside the polygonal pattern 10 (S340). A flood-fill algorithm may be used to allocate the preset raster value to each of the additional fourth grid points 48. Thus, corresponding raster values may be given to the first and second grid points 42 and 44 respectively surrounding the edges of the polygonal pattern 10, and may also be given to the fourth grid points 48 outside the polygonal pattern 10.

The raster values of the second grid points 44 may be greater than those of the first grid points 42, and the raster values of the fourth grid points 48 may be greater than those of the second grid points 44. For example, each of the raster values of the fourth grid points 48 may be set to 1. The raster values of the first and second grid points 42 and 44 may be set to greater than 0 and less than 1. Respective initial values (e.g., 0) may be given to other grid points on the grid that are inside the polygonal pattern 10.

In some embodiments, the polygonal pattern 10 may include a hollow region (e.g., a hole) to be formed on a wafer. Because the first, second, and fourth grid points 42, 44, and 48 have corresponding raster values and a predetermined pattern including the polygonal pattern 10 is converted to raster data in a shape of matrix, a raster image of the predetermined pattern may be obtained including the polygonal pattern 10.

Operation S170 in FIG. 5 may then be performed. When the mask layout has other polygonal patterns, operation S110 in FIG. 5 may be returned back. When the mask layout has no other polygonal patterns, a raster image of the mask layout may be obtained to include the polygonal pattern 10.

Figure 10:
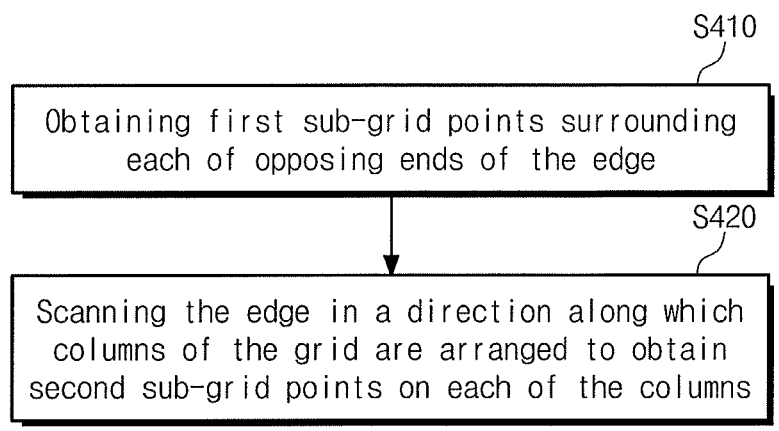
FIG. 10 illustrates an embodiment of an operation in the method of FIG. 5.
Figure 15:
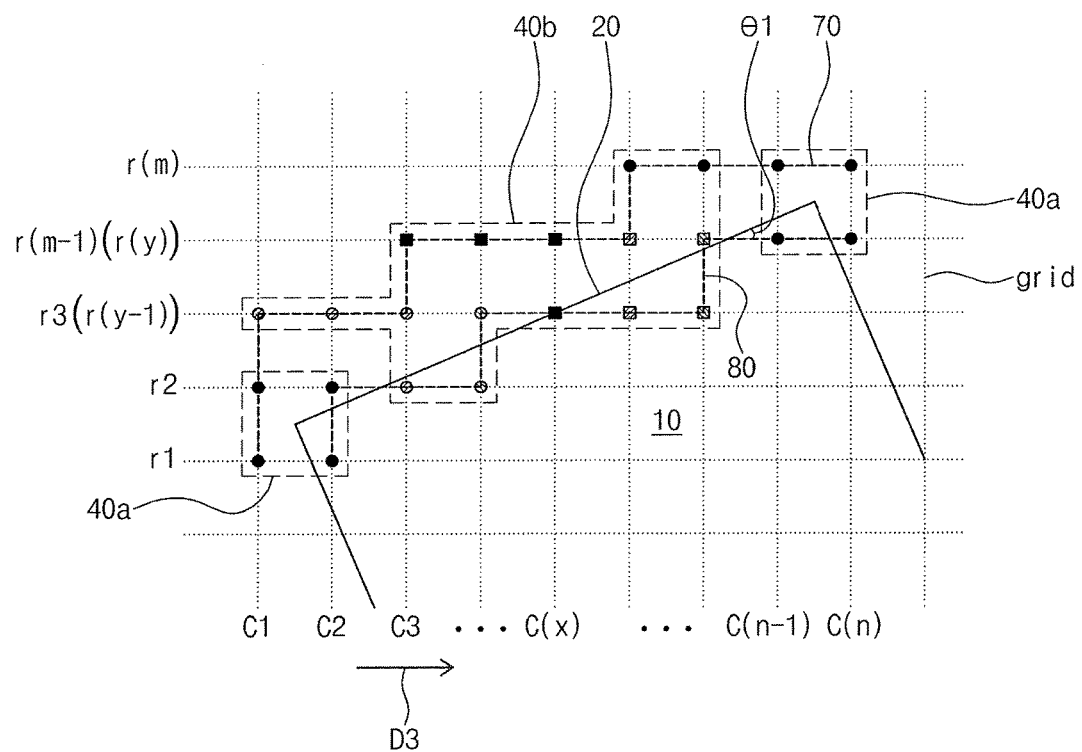
FIG. 15 illustrates an embodiment of an operation in the method of FIG. 5.

FIG. 10 illustrates an embodiment of operation S120 in FIG. 5, and FIG. 15 illustrates an embodiment of operation S120 in FIG. 5. Referring to FIGS. 5, 10, and 15, the grid may include the polygonal pattern 10 acquired from the mask layout (S110), and grid points surrounding an edge 20 of the polygonal pattern 10 may be obtained (S120). In some embodiments, as shown in FIG. 15, the edge 20 of the polygonal pattern 10 may be inclined at a predetermined angle to the grid. In one embodiment, an angle θ1 between the edge 20 and one row of the grid may be greater than 0° and less than or equal to 45°.

In this case, in order to obtain the grid points surrounding the edge 20, first sub-grid points 40a surrounding each of opposing ends of the edge 20 may be obtained (S410). For example, as shown in FIG. 15, one end of the edge 20 may be between first and second columns c1 and c2 immediately adjacent to each other and between first and second rows r1 and r2 immediately adjacent to each other. The first sub-grid points 40a surrounding the one end of the edge 20 may be cross points where the first and second rows r1 and r2 intersect the first and second columns c1 and c2.

Similarly, an opposite end of the edge 20 may be between an n−1$^{th}$ column c(n−1) and an n$^{th}$ column c(n) immediately adjacent to each other and between an m−1$^{th}$ row r(m−1) and an m$^{th}$ row r(m) immediately adjacent to each other. The first sub-grid points 40a surrounding the opposite end of the edge 20 may be cross points where the n−1$^{th}$ and n$^{th}$ columns c(n−1) and c(n) intersect the m−1$^{th}$ and m$^{th}$ rows r(m−1) and r(m), where n and m are integers greater than 1.

Thereafter, the edge 20 may be scanned in a direction D3 along which columns of the grid are arranged. Thus, second sub-grid points 40b may be obtained on each of the columns between the opposing ends of the edge 20 (S420). For example, as shown in FIG. 15, it may be possible to obtain a pair of second sub-grid points 40b on the third column c3 of the grid that are immediately adjacent to each other across the edge 20. One of the pair of second sub-grid points 40b may be a cross point of the third column c3 and the second row r2, and the other of the pair of second sub-grid points 40b may be a cross point of the third column c3 and the third row r3. In this case, it may be possible to additionally obtain second sub-grid points 40b, where the third row r3 intersects the first and second columns c1 and c2.

Similarly, it may be possible to obtain a pair of second sub-grid points 40b on an $x^{th}$ column c(x) that are directly adjacent to each other across the edge 20. One of the sub-grid points 40b may be a cross point of the $x^{th}$ column c(x) and a $y-1^{th}$ row r(y−1). The other of the second sub-grid points 40b may be a cross point of the $x^{th}$ column c(x) and a $y^{th}$ row r(y). In this case, it may be possible to additionally obtain second sub-grid points 40b, where the $y^{th}$ row r(y) intersects $x-2^{th}$ and $x-1^{th}$ columns c(x−2) and c(x−1), where x and y are an integer greater than 2. Obtaining the second sub-grid points 40b may be carried out until the $x^{th}$ column c(x) reaches the $n^{th}$ column c(n), where n is an integer greater than x.

The first and second sub-grid points 40a and 40b may be the grid points obtained in operation S120 in FIG. 5. Thus, the first and second sub-grid points 40a and 40b may be the grid points surrounding the edge 20 of the polygonal pattern 10. Thereafter, operations S130 to S180 in FIG. 5 may be performed. At operation S160 in FIG. 5, the outer and inner rings 70 and 80 respectively positioned outside and inside the polygonal pattern 10 may be established based on the first and second sub-grid points 40a and 40b.

Figure 11:
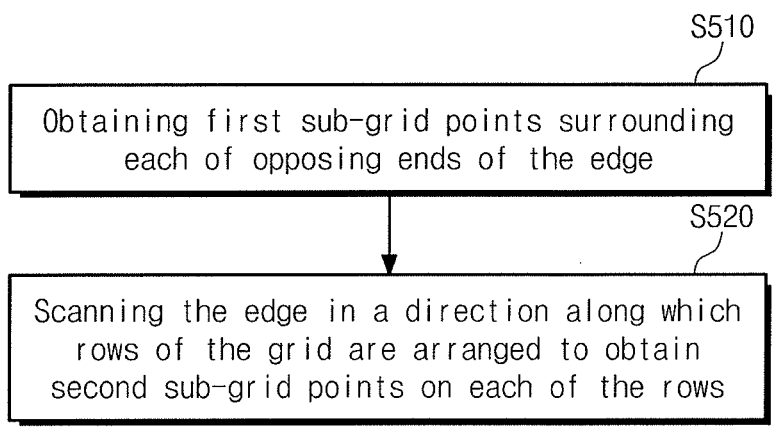
FIG. 11 illustrates an embodiment of an operation in the method of FIG. 5.

FIG. 11 illustrates an embodiment of operation S120 in FIG. 5, and FIG. 16 illustrates an embodiment of operation S120 in FIG. 5. Referring to FIGS. 5, 11, and 16, the grid may be provided with the polygonal pattern 10 acquired from the mask layout (S110). Grid points surrounding an edge 20 of the polygonal pattern 10 may be obtained based on operation (S120). In some embodiments, as shown in FIG. 16, the edge 20 of the polygonal pattern 10 may be inclined at a predetermined angle relative to the grid. An angle θ2 between the edge 20 and one row of the grid may be greater than 45° and less than 90°.

In this case, in order to obtain the grid points surrounding the edge 20, first sub-grid points 40a surrounding each of opposing ends of edge 20 may be obtained (S510). For example, as shown in FIG. 16, one end of the edge 20 may be between first and second columns c1 and c2 immediately adjacent to each other and between first and second rows r1 and r2 immediately adjacent to each other. The first sub-grid points 40a surrounding the one end of the edge 20 may be cross points where the first and second rows r1 and r2 intersect the first and second columns c1 and c2. Similarly, an opposite end of the edge 20 may be between an $n-1^{th}$ column c(n−1) and an $n^{th}$ column c(n) immediately adjacent to each other and between an $m-1^{th}$ row r(m−1) and an $m^{th}$ row r(m) immediately adjacent to each other. The first sub-grid points 40a surrounding the opposite end of the edge 20 may be cross points where the $n-1^{th}$ and $n^{th}$ columns c(n−1) and c(n) intersect the $m-1^{th}$ and $m^{th}$ rows r(m−1) and r(m), where n and m are an integer greater than 1.

Thereafter, the edge 20 may be scanned in a direction D4 along which rows of the grid are arranged. Thus, second sub-grid points 40b may be obtained on each of the rows between the opposing ends of the edge 20 (S520). For example, as shown in FIG. 16, a pair of second sub-grid points 40b on the third row r3 of the grid may be obtained that are immediately adjacent to each other across the edge 20. One of the pair of second sub-grid points 40b may be a cross point of the third row r3 and the second column c2. The other of the pair of second sub-grid points 40b may be a cross point of the third row r3 and third column c3. In this case, it may be possible to additionally obtain second sub-grid points 40b where the third column c3 intersects the first and second rows r1 and r2.

Similarly, it may be possible to obtain a pair of second sub-grid points 40b on an $y^{th}$ row r(y) that are immediately adjacent to each other across the edge 20. One of the sub-grid points 40b may be a cross point of the $y^{th}$ row r(y) and an $x-1^{th}$ column c(x−1). The other of the second sub-grid points 40b may be a cross point of the $y^{th}$ row r(y) and an $x^{th}$ column c(x). In this case, it may be possible to additionally obtain second sub-grid points 40b where the $x^{th}$ column c(x) intersects $y-2^{th}$ and $y-1^{th}$ rows r(y−2) and r(y−1), where x and y are integers greater than 2. obtaining the second sub-grid points 40b may be carried out until the $y^{th}$ row r(y) reaches the $m^{th}$ row r(m), where m is an integer greater than y.

The first and second sub-grid points 40a and 40b may be the grid points obtained at operation S120 in FIG. 5. For example, the first and second sub-grid points 40a and 40b may be the grid points surrounding the edge 20 of the polygonal pattern 10. Thereafter, operations S130 to S180 in FIG. 5 may be performed. In operation S160 in FIG. 5, the outer and inner rings 70 and 80 respectively positioned outside and inside the polygonal pattern 10 may be established based on the first and second sub-grid points 40a and 40b.

Referring back to FIG. 4, after obtaining the raster image of the mask layout, a contour image may be produced from the raster image (S200). The contour image may be a predicted profile of photoresist pattern to be formed on the wafer. The computer system 500 may drive the simulation tool 520 to produce the contour image. The raster image of the mask layout and a predetermined optical model may be used as input data in the simulation tool 520. The optical model may include data on process parameters (e.g., intensity and wavelength of an exposure beam, physical parameters related to an illumination unit, physical/chemical characteristics of photoresist, etc.) applied to a photolithography process using the photomask. In addition, the optical model may further include data on process parameters applied to a subsequent etch process in which a photoresist pattern formed using the photomask is used as an etch mask.

The contour image may be compared with a target image (S300). The target image may be an image of pattern which is to be printed on the wafer using the mask layout. A decision may be performed to determine whether or not an error between the contour and target images is within a predetermined tolerance (S400). When the error between the contour and target images exceeds the predetermined tolerance, correction may be performed on the mask layout (S500).

The mask layout may be corrected using various methods. According to one method, small patterns less than a predetermined resolution are added to or removed from patterns of the mask layout. The computer system 500 may drive the correction unit 530 to compare the contour image with the target image, to determine whether the error between the contour and target images is within the predetermined tolerance, and to correct the mask layout. When the error between the contour and target images is within the predetermined tolerance, a final mask layout may be determined (S600). Operation S3000 in FIG. 2 may be performed using the final mask layout. Thus, the photomask may be fabricated to include mask patterns corresponding to the final mask layout.

In order to perform optical proximity correction on a mask layout in photomask formation, an image of the mask layout may be converted from a vector graphics format to a raster graphics format. When a predetermined (e.g. polygonal) pattern acquired from the mask layout is processed to convert its vector image to a raster image, rasterization may be imperfectly carried out at a boundary of the predetermined (e.g. polygonal) pattern. Accordingly, the raster image may not exactly reflect the mask layout. Moreover, greater numbers of vertices in the predetermined (e.g. polygonal) pattern may result in longer runtimes in order to convert an image (vector image) of the predetermined (e.g. polygonal) pattern to a raster image.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The computer systems, simulation tools, image converters, correction and other processing features of the embodiments disclosed herein may be implemented in logic which, for example, may include hardware, software, or both. When implemented at least partially in hardware, the computer systems, simulation tools, image converters, correction and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the computer systems, simulation tools, image converters, correction and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with one or more of the aforementioned embodiments, grid points surrounding an edge of a predetermined (e.g. polygonal) pattern may be obtained and a path may be constructed to extend from the edge toward neighboring edges of the predetermined (e.g. polygonal) pattern. A raster value may be allocated to each of the grid points. The raster value may be an overlap area between a pixel with a center located on each of the grid points and the predetermined (e.g. polygonal) pattern whose boundary is limited by the path. Therefore, the boundary of the predetermined (e.g. polygonal) pattern may be more exactly reflected by the raster image of the mask layout including the predetermined (e.g. polygonal) pattern.

Further, outer and inner rings respectively positioned outside and inside the predetermined (e.g. polygonal) pattern may be established based on the grid points respectively surrounding the edges of the predetermined (e.g. polygonal) pattern. The outer ring may include first grid points of the grid points. The inner ring may include second grid points of the grid points. The first grid points may have a raster value less than that of the second grid points. A preset raster value may be easily allocated to each of grid points inside or outside the predetermined (e.g. polygonal) pattern based on the outer and inner rings. Thus, the runtime to convert an image (vector image) of the polygonal pattern to the raster image may be reduced.

Moreover, in accordance with one or more of the aforementioned embodiments, a method may be provided to more efficiently obtain a more exact way of rasterizing a mask layout. As a result, fidelity and efficiency of optical proximity correction (OPC) for the mask layout may be attained and a photomask with mask patterns for transferring a mask layout to a wafer may be more easily fabricated.

Example embodiments have been disclosed herein, and although specific terms are employed, they are used and are to be interpreted in a generic and descriptive sense only and not for purpose of limitation. The embodiments (or portions thereof) may be combined to form additional embodiments. In some instances, features, characteristics, and/or elements described in connection with a particular embodiment may be used singly or in combination with features, characteristics, and/or elements in other embodiments unless otherwise indicated. Accordingly, it will be understood by those of skill in the art that various changes in form and details may be made without departing from the spirit and scope of the embodiments set forth in the claims.

What is claimed is:

1. A method for correcting a mask layout, the method comprising:
    driving an image converter to obtain a raster image of the mask layout by:
        providing, on a grid, a pattern from the mask layout;
        obtaining grid points surrounding an edge of the pattern;
        constructing, on the pattern, a path extending from the edge toward adjacent edges of the pattern; and
        generating the raster image of the mask layout by allocating a raster value to each of the grid points, the raster value corresponding to an overlap area between a pixel having a center located on one of the grid points and the pattern having a boundary limited by the path;
    driving a simulation tool to produce a contour image based on the raster image; and
    correcting the mask layout based on a comparison of the contour image with a target image to fabricate a photomask corresponding to the corrected mask layout.

2. The method as claimed in claim 1, wherein obtaining the grid points, constructing the path, and allocating the raster value to each of the grid points are performed on each of a plurality of edges of the pattern.

3. The method as claimed in claim 2, wherein obtaining the raster image includes:

establishing, on the grid, an outer ring outside the pattern and an inner ring inside the pattern using the grid points, wherein the outer ring includes first grid points of the grid points connected by an imaginary line and the inner ring includes second grid points of the grid points connected by an imaginary line, and wherein the first grid points include raster values less than those of the second grid points.

4. The method as claimed in claim 3, wherein the outer and inner rings have a same planar shape.

5. The method as claimed in claim 3, wherein obtaining the raster image includes:
searching a third grid point inside the pattern based on a difference between a raster value of one of the first grid points and a raster value of one of the second grid points; and
allocating a preset raster value to the third grid point, wherein, on the grid, the one of the first grid points is immediately adjacent to the one of the second grid points.

6. The method as claimed in claim 5, wherein searching the third grid point includes:
creating a first direction extending from the outer ring toward the inner ring based on a difference between the raster value of the one of the first grid points and the raster value of the one of the second grid points; and
obtaining the third grid point adjacent to the one of the second grid points in the first direction.

7. The method as claimed in claim 5, wherein:
obtaining the raster image includes allocating raster values to additional third grid points inside the pattern,
the raster values allocated to the additional third grid points are equal to the preset raster value.

8. The method as claimed in claim 7, wherein allocating the raster values to the additional third grid points is performed based on a flood-fill algorithm.

9. The method as claimed in claim 3, wherein obtaining the raster image includes:
searching a fourth grid point outside the pattern based on a difference between a raster value of one of the first grid points and a raster value of one of the second grid points; and
allocating a preset raster value to the fourth grid point, wherein, on the grid, the one of the first grid points is immediately adjacent to the one of the second grid points.

10. The method as claimed in claim 9, wherein searching the fourth grid point includes:
creating a second direction that extends from the inner ring toward the outer ring based on a difference between the raster value of the one of the first grid points and the raster value of the one of the second grid points; and
obtaining the fourth grid point adjacent to the one of the first grid points in the second direction.

11. The method as claimed in claim 1, wherein the pixel includes a size less than limit values given by an MRC (Mask Rule Check).

12. The method as claimed in claim 1, wherein:
an angle between the edge of the pattern and one row of the grid is greater than 0° and less than or equal to 45°,
obtaining the grid points includes:
obtaining first sub-grid points surrounding each of opposing ends of the edge; and
scanning the edge in a direction along which columns of the grid are arranged to obtain second sub-grid points on each of columns between the opposing ends of the edge, the second sub-grid points immediately adjacent to each other across the edge.

13. The method as claimed in claim 1, wherein:
an angle between the edge of the pattern and one row of the grid is greater than 45° and less than 90°,
obtaining the grid points includes:
obtaining first sub-grid points surrounding each of opposing ends of the edge; and
scanning the edge in a direction along which rows of the grid are arranged to obtain second sub-grid points on each of rows between the opposing ends of the edge, the second sub-grid points immediately adjacent to each other across the edge.

14. A method for fabricating a photomask, the method comprising:
driving an image converter to obtain a raster image of a mask layout;
driving a simulation tool to produce a contour image based on the raster image;
driving a corrector to correct the mask layout based on a comparison of the contour image with a target image; and
forming the photomask including mask patterns corresponding to the corrected mask layout, wherein obtaining the raster image includes:
providing, on a grid, a pattern acquired from the mask layout;
obtaining grid points surrounding an edge of the pattern;
constructing, on the pattern, a path that extends from the edge toward adjacent edges of the pattern; and
allocating a raster value to each of the grid points, the raster value corresponding to an overlap area between a pixel having a center located on one of the grid points and the pattern having a boundary limited by the path.

15. The method as claimed in claim 14, wherein:
the pattern includes an opposite edge facing the edge, and
the pixel is smaller than a distance between the edge and the opposite edge.

16. A method for correcting a mask layout, the method comprising:
providing a pattern from the mask layout on a grid, the mask layout in a vector graphics format;
obtaining grid points corresponding to an edge of the pattern;
constructing a path on the pattern, the path extending from the edge toward a number of adjacent edges of the pattern, the path not extending around all of the pattern;
generating a raster image of the mask layout by allocating raster values to the grid points, the raster values corresponding to an overlap area between a pixel and the pattern;
producing a contour image based on the raster image; and
correcting the mask layout based on a comparison of the contour image with a target image to fabricate a photomask corresponding to the corrected mask layout.

17. The method as claimed in claim 16, wherein the pixel is one having a center located on one of the grid points.

18. The method as claimed in claim 16, further comprising:
establishing a first path and an second path on the grid based on the grid points,
wherein the first path is outside the pattern and includes first grid points and the second path is inside the pattern and includes second grid points, and wherein the first grid points include raster values which are less than raster values of the second grid points.

19. The method as claimed in claim 18, wherein the first and second paths have a same shape.

20. The method as claimed in claim 16, wherein the pattern is a polygonal pattern.

* * * * *